United States Patent [19]

Hemmerle et al.

[11] Patent Number: 5,373,222
[45] Date of Patent: Dec. 13, 1994

[54] DATUMING DEVICE FOR MEASURING DISPLACEMENTS NOT PARALLEL WITH A DISPLACEMENT PROBE'S LINE OF TRAVEL

[75] Inventors: R. David Hemmerle, Blue Ash; Charles W. Muchmore, Clarksville; William D. Rouse, Milford; Timothy M. Heitzman, Maineville, all of Ohio

[73] Assignee: General Electric Company, Cincinnati, Ohio

[21] Appl. No.: 32,580

[22] Filed: Mar. 17, 1993

[51] Int. Cl.$^5$ .............................................. G01B 21/04
[52] U.S. Cl. ................................... 318/652; 318/572; 33/504; 33/556
[58] Field of Search .............. 318/567, 569, 572, 652; 33/700, 710, 712, 832, 502, 503, 504, 556, 567; 364/474.37

[56] References Cited

U.S. PATENT DOCUMENTS

| | | | |
|---|---|---|---|
| 3,631,603 | 1/1972 | Munro . | |
| 4,190,889 | 2/1980 | Etoh et al. | 364/474 |
| 4,382,215 | 5/1983 | Barlow et al. | 318/568 |
| 4,384,332 | 5/1983 | McMurtry | 364/474 |
| 4,451,892 | 5/1984 | McMurtry | 364/474 |
| 4,471,676 | 9/1984 | Mason | 83/13 |
| 4,541,054 | 9/1985 | Peck et al. | 364/474 |
| 4,554,495 | 11/1985 | Davis | 318/572 |
| 4,561,058 | 12/1985 | McMurtry | 364/474 |
| 4,562,392 | 12/1985 | Davis et al. | 318/39 |
| 4,617,503 | 10/1986 | Davis et al. | 318/572 |
| 4,875,177 | 10/1989 | Jarman | 3r/599 |
| 4,879,817 | 11/1989 | McMurtry | 3/502 |
| 4,899,094 | 2/1990 | Pilborough | 18/567 |
| 5,007,006 | 4/1991 | Taylor et al. | 364/571.05 |
| 5,095,788 | 3/1992 | Matoni | 82/118 |
| 5,101,572 | 4/1992 | Kwong et al. | 33/558 |

*Primary Examiner*—Bentsu Ro
*Attorney, Agent, or Firm*—Jerome C. Squillaro; Bernard E. Shay

[57] ABSTRACT

A datuming device is provided for use with a machine tool having a movable member which is guided under computer numerical control. The datuming device permits measurement of displacements in a direction not parallel with a displacement probe's line of travel. The device includes a non-sensitive surface which, when probed by the displacement probe, does not indicate a changing displacement when the movable member is moved from a first position to a second position. The nonsensitive surface serves as a reference surface. The device further includes a sensitive surface which, when probed by the displacement probe, exhibits a changing displacement when the movable member is moved from the first position to the second position. The sensitive surface is generally configured as an inclined surface on the datuming device.

9 Claims, 6 Drawing Sheets

DATUMING DEVICE FOR MEASURING DISPLACEMENTS NOT PARALLEL WITH A DISPLACEMENT PROBE'S LINE OF TRAVEL

BACKGROUND OF THE INVENTION

This invention relates in general to datuming devices using a displacement probe and, more particularly, to datuming devices which are capable of evaluating displacements and alignments that are not parallel to the probe's axis direction of travel.

At it's present stage of development, the precision machining field continues to develop at a rapid pace toward more complete automation. Systems that are totally dependent on manual operations have largely given way to techniques whereby manufactured parts are made with general purpose, numerically controlled (NC) machining systems. Although cutting or other removal of material occurs automatically in such systems, numerous manual operations are unfortunately still required, primarily for measuring the machined dimensions, and for making cutter adjustments using an ordinary numerical control cutter offset. These manual measurements and adjustments of the cutting tool are necessary to take into account a large number of variables, such as wear of the cutting tool, repositioning and/or replacement of the cutting tool, as well as dimensional changes of the cutting tool, the work piece and the machining apparatus itself due to such factors as heating, deflection under load and the like.

By way of example, in a typical operation carried out with a numerically controlled machine tool such as a lathe, certain adjustments, i.e., tool offsets, must be manually implemented by the operator after the machine is set up for the manufacture of a particular work piece or part. Prior to the start of machining, the operator must advance the cutting tool to a tool setting surface and determine the tool position by manually measuring the space between the tool and the reference surface. This is normally done with a piece of shim material or the like and such measurements then form the basis for manually making the tool offsets. Where the lathe includes tool holding means such as a multiple tool turret, this operation must be carried out separately for each tool, as well as for each of the axes (of motion) of the machine. Prior to making the final or finishing cut for a particular work piece surface, the various dimensions of the semi-finished work piece surface are measured by using a hand-held gauge in order to measure the conformance of the actual dimensions of the finished surface to the desired dimensions.

The manual operations described above are individually time-consuming and take up a significant amount of the total time required to machine a particular work piece to the desired dimensions. This serves to limit the manufacturing capacity of the machine tool. Considering present day costs of a lathe or a milling machine (machining center), any reduction of the capacity of the machine tool becomes a matter of economic significance. Further, all such manual operations are prone to introducing errors into the manufacturing process.

As is generally recognized, the solution to the foregoing problems is to automate manual measurements and the manual adjustments of the cutting tool by the use of a computer-operated numerical control (CNC) system. In such a system, the computer may either be positioned remote from the numerical control unit, or it may be incorporated in the latter in the form of a microcomputer, for example. Instead of down-loading successive blocks of data stored on tape or the like as is the case in an ordinary NC system, a computer numerical control (CNC) system is capable of storing entire programs and calling them up in a desired sequence, editing the programs by addition or deletion of blocks, and carrying out the computations of offsets and the like.

For the CNC system to control a cutting tool or other implement as accurately as possible, it is necessary for the system to know the location of the cutting tool with great precision. To achieve this end, it is known to mount a contact probe or tool sensor on the bed of the machining apparatus, or on a pivotal arm that can be swung out of the way when desired. The position of the cutting tool can be calibrated against such a probe by noting the probing axis scale position when contact with the probe occurs. From the observed deviations between the programmed and actual positions, a compensating offset may be determined and stored in the memory associated with the computer numerical control system. The offset compensates for the difference between the programmed contact position of the cutting tool or other implement and the actual contact position. It is also known to mount a contact probe or part sensor in a tool holding structure; to calibrate such a probe against a reference surface on the machine; to probe the machined surface of the work piece and to derive from such probing the information for determining the final offset required for the finishing cut; and to probe the finished surface for conformance with the desired dimensions.

While displacement probes have been able to accurately measure displacement in the machine axis direction of the probes movement for some time now, apparatus and techniques for measuring displacement in a direction not parallel to the probe's axis motion have heretofore been generally unavailable, difficult to implement or expensive to fabricate. For example, a laser interferometer can be used to measure cross-directional travel but requires special equipment and excessive set-up time.

In CNC machines it is often desirable to measure displacement in directions not parallel to the displacement probe's movement. For example, in a vertical turning lathe, the rotatable bed on which the work piece is situated may exhibit backlash when it is turned clockwise to a predetermined rotational position and then turned counter-clockwise back to that same position. To measure such backlash and compensate for the same, it is necessary to measure displacement in a direction not parallel with probe motion, namely, an angular displacement with respect to the rotatable bed.

Important machine tool alignments and displacement measurements exist which are critical to the machining processing and which have not been automated due to the fact that such alignments and displacements are not parallel to the probe's line of travel or axial feed direction. For example, horizontal lathes and vertical turning lathes do not have "Y" axis or "Y" direction of travel. However, there are important displacements on these machines in the "Y" direction. If the cutting tool point for such a machine is misaligned in the "Y" direction, this can cause undesired chatter, tool rubbing and other erratic cutting conditions. Moreover, if diameters are probed on such machines when the probe is misaligned in the "Y" direction, then improper size measurements will result since chords will be measured instead of diameters.

SUMMARY OF THE INVENTION

Accordingly, one object of the present invention is to provide a datuming device capable of measuring linear displacements which are perpendicular to a displacement probe's line of travel.

Another object of the present invention is to provide a datuming device capable of measuring angular displacement, the tangents of which are perpendicular to a displacement probe's line of travel.

Yet another object of the present invention is to provide a datuming device which is capable of measuring lost motion.

In accordance with one embodiment of the datuming system of the present invention, a datuming system is provided for use with a machine tool having a movable member. The datuming system includes a datuming device. The datuming system also includes a displacement probe for probing the datuming device to measure displacement. The datuming system further includes a non-sensitive surface, such non-sensitive surface acting as a reference for the probe. The datuming system still further includes a sensitive surface, situated on the datuming device, which when probed by the probe exhibits a changing displacement when the movable member is moved from a first position to a second position.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1:
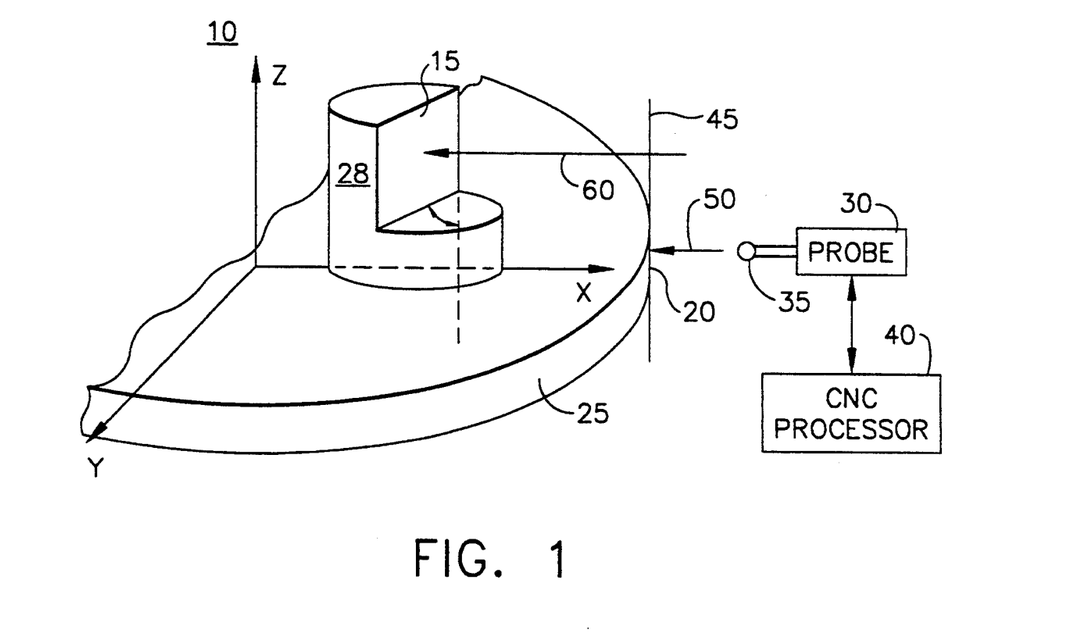
FIG. 1 is a perspective view of a radial inclined surface datuming device in a displacement measuring system.

FIG. 1 is a perspective representation of a datuming apparatus 10 in accordance with the present invention. Datuming apparatus 10 includes a sensitive surface 15 and a non-sensitive surface 20, the definitions of which will become clear in the subsequent discussion. Non-sensitive surface 20 is situated on a rotatable reference member 25 which, for example, may comprise the numerically controlled machine, a fixture for holding the work piece or the work piece itself. In this particular embodiment, sensitive surface 15 is an inclined surface which is situated on a pin 28 located on reference member 25.

A displacement probe 30 is situated adjacent reference member 25 and pin 28 such that probe tip 35 can reach both non-sensitive surface 20 and sensitive surface 15. A Renishaw TM displacement probe is used as displacement probe 30 in the embodiment of FIG. 1. Probe 30 is coupled to a CNC processor 40 which controls the probing action of probe 30 and the numerically controlled machine, a portion of which is represented by reference member 25. One type of probe which is suitable for use as probe 30 is a touch trigger type displacement probe, although other types of displacement probes could be employed as well. Probe 30 moves axially back and forth parallel with the X axis to determine the displacement between the point at which probe tip 35 contacts a surface such as non-sensitive surface 20 and a predetermined reference point.

The term "non-sensitive" as used herein to describe non-sensitive surface 20 is defined to mean those surfaces which when probed by displacement probe 30 do not exhibit a changing displacement while reference member 25 is angularly rotated or moved. For example, non-sensitive surfaces are those surfaces which are located either in a flat plane normal to the probe's line of travel and/or in line with the direction of the displacement being measured or a curved radial surface about an axis of rotation of the machine, fixture or work piece on which the nonsensitive surface is located.

The term "sensitive" as used herein to describe sensitive surface 15 is defined to mean those surfaces on pin 28 or other member which when probed by probe 30 will exhibit a varying displacement while reference member 25 is angularly rotated. For example, sensitive surfaces are typically inclined flat surfaces or planes which have one axial direction perpendicular to the probe's line of travel and the other axial direction at an angle of approximately 45 degrees with respect to the probe's line of travel. In other words, sensitive surfaces are typically straight planes inclined at an angle of approximately 45 degrees with respect to the non-sensitive surface. As illustrated in FIG. 1, sensitive surface 15 is inclined at an angle of 45 degrees with respect to the tangent 45 of non-sensitive surface 20. In other words, this sensitive surface is inclined at 45 degrees to a radial center line when assembled to a machine tool's rotary element or fixture. It should be understood that inclinations of other than 45 degrees can also be used.

The configuration of FIG. 1 may be employed for probing of radial direction surfaces. It is seen in FIG. 1 that such a radial direction surface is incorporated in pin 28 which includes the above described axial flat inclined sensitive surface 15 approximately through its diameter.

The axial probing direction in which probe 30 probes non-sensitive surface 20 is indicated in FIG. 1 by arrow 50. The axial probing direction in which probe 30 probes sensitive surface 15 is indicated in FIG. 1 by arrow 60. The drop is established between the sensitive and non-sensitive surfaces in the manner described below.

Figure 2:
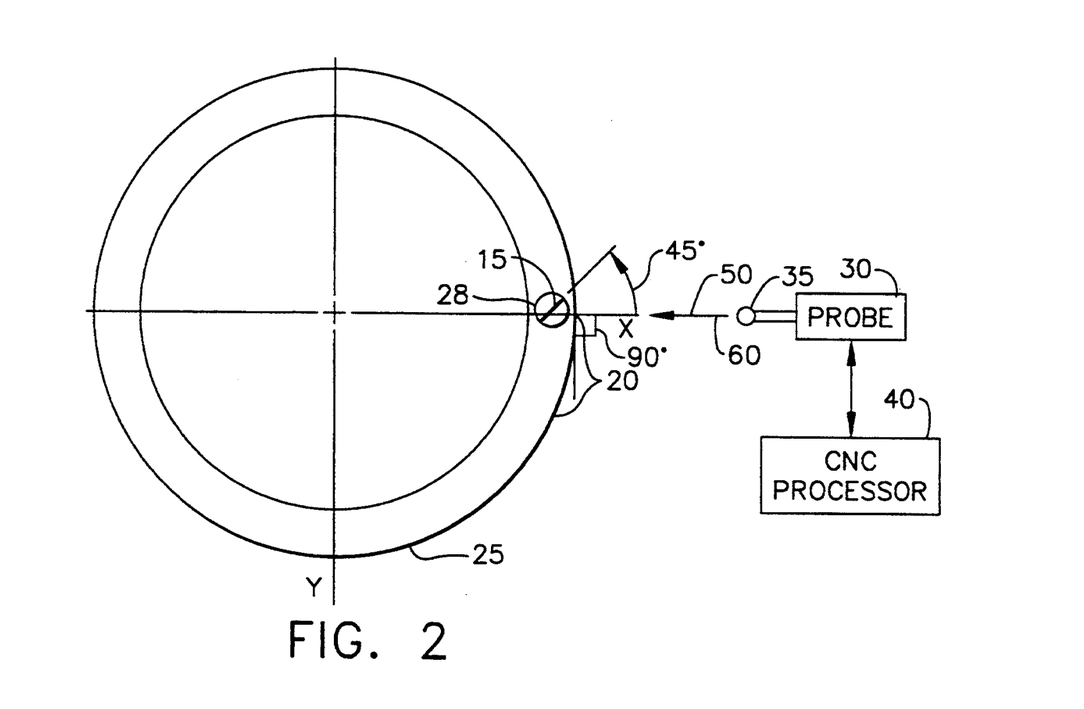
FIG. 2 is a top view of the radial inclined surface datuming device of FIG. 1 shown in a displacement measuring system.

FIG. 2 shows a top view of the datuming configuration of FIG. 1 for probing radial direction surfaces. It is seen in FIG. 2 that non-sensitive surface 20 corresponds to the surface defined at the outer diameter of member 25. While member 25 may comprise the machine, fixture or work piece, for purposes of this example it is assumed that member 25 is a rotary table of the machine. When rotary table 25 rotates, it is observed that displacement measured by probe 30 in probing direction 50 to non-sensitive surface 20 does not change. This is a characteristic feature of the selected non-sensitive surface.

However, during the same rotation of rotary table 25, the displacement measured by probe 30 in probing direction 60 (which is aligned with direction 50) to sensitive surface 15 changes as the table rotates. This is a characteristic feature of the selected sensitive surface. It will be appreciated that inclined sensitive surface 15 will be useful is determining displacements in a direction not parallel with the probe's line of travel as will now be discussed.

Figure 3:
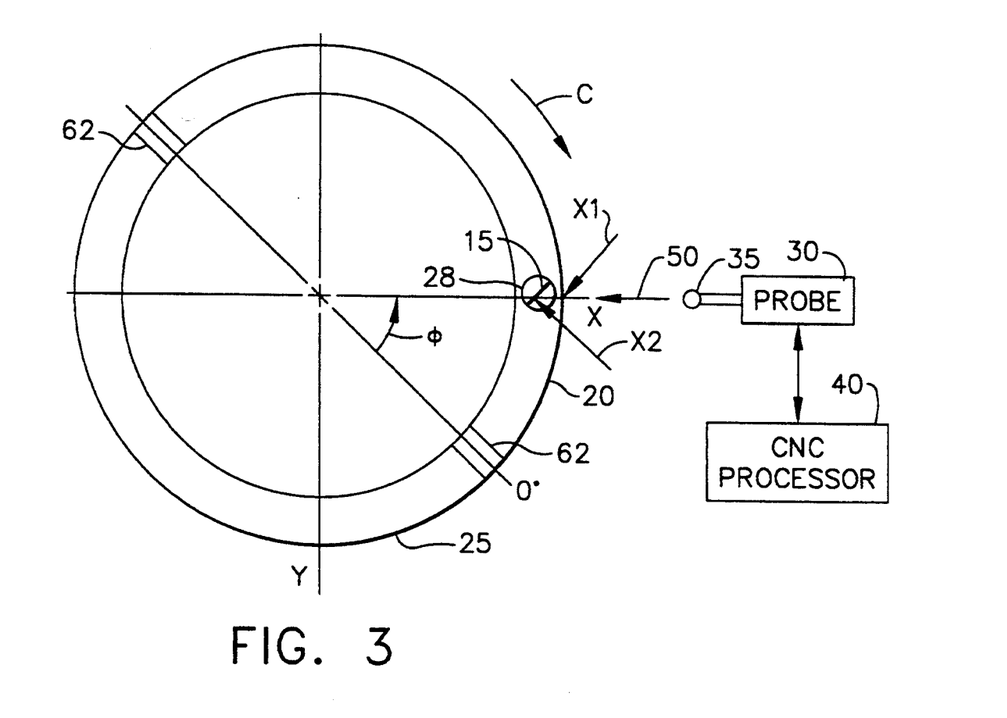
FIG. 3 is a top view of a radial inclined surface datuming device showing probe strike positions.

The sequence of operations for taking displacement measurements in accordance with the present invention for a radial inclined surface datuming device 28 is now described in detail. More particularly, the following is an example of how the radial inclined surface can be used to evaluate the quality of a vertical turning lathe (V.T.L.) rotary table's orientation position, clocking error, and probe cross-over error. As seen in FIG. 3, in the present case the numerically controlled machine is a (live spindle) vertical turning lathe which has a "C" axis or rotary table positioning capability. The C axis corresponds to the Z axis through the center of rotation. In FIG. 3, the "C direction of rotation" is clockwise about the Z axis through the origin as indicated. The probing direction is again indicated by arrow 50. Rotary table 25 includes a master slot 62 for facilitating alignment and calibration of table 25 and fixtures and work pieces attached thereto.

A radial inclined surface datuming device or pin 28 is situated on the machine's table 25. Nonsensitive surface 20 is situated at the outer diameter of table 25 and extends around the circumference thereof. After orientation, the table 25 is rotated to a previously established angle, theta ($\theta°$). Angle $\theta$ is that angle which aligns the inclined surface pin 28 to the X axis to pre-establish a target drop (TD).

Non-sensitive surface 20 is probed in the "X" direction as indicated by arrow 50, and probe 30 captures the X axis probe strike position as X1 as indicated in FIG. 3. Probe 30 is moved up the Z axis. Inclined surface 15 is then probed and the corresponding probe strike feedback position is stored in CNC processor 40 as X2. CNC processor 40 establishes the drop distance by subtracting X2 from X1, which for the first drop is (X1−X2)=drop 1 or D1. The first drop D1 is not compared to the previously established correct target drop (TD), as this single drop is a result of composite errors.

Figure 4:
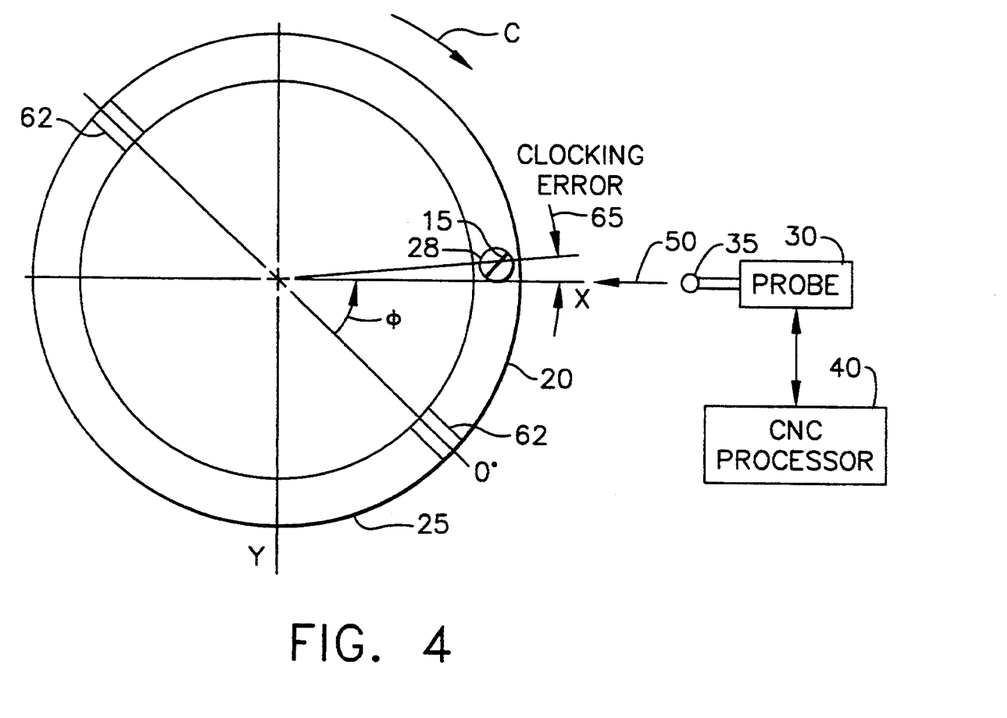
FIG. 4 is a top view of a radial inclined surface datuming device showing clocking error.
Figure 5:
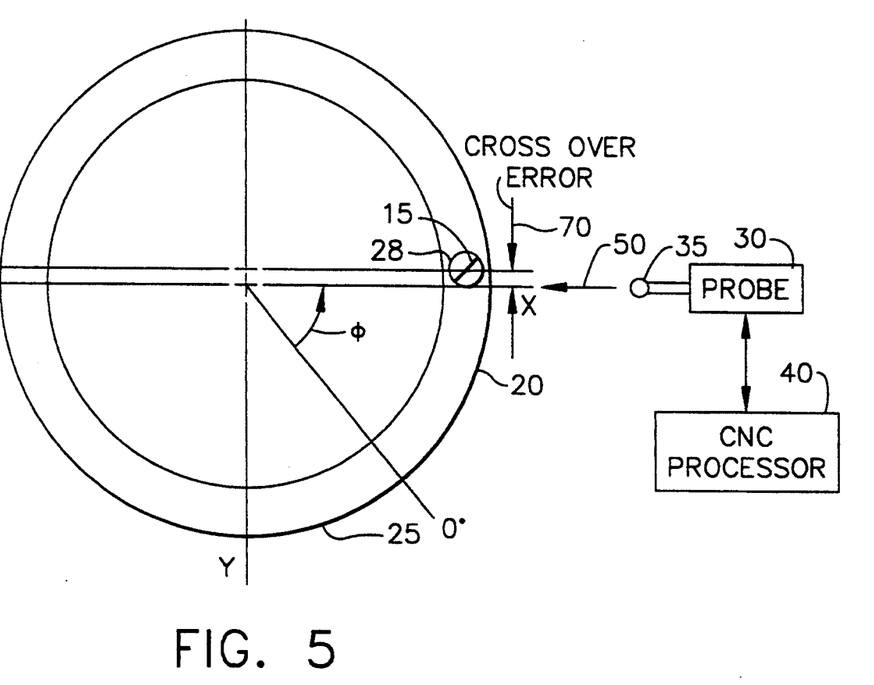
FIG. 5 is a top view of a radial inclined surface datuming device showing cross-over error.

Both clocking and cross-over errors are observed as indicated in FIGS. 4 and 5, respectively. The clocking error is angular in nature and is seen in FIG. 4 as clocking error 65. The clocking error is defined as the angular difference between master slot 62 and the X axis direction when the C axis is at 0 degrees. The cross-over error is linear in nature and is also seen in FIG. 5 as cross-over error 70. The cross-over error is defined as the linear distance in the Y direction between the probe's path and the center of rotation as measured in the Y direction. Composite error conditions can be combined to be cumulative (both resulting value signs being the same thus when combined resulting in a large value), or observed as complementing each other in a negating arrangement wherein different value signs result in a smaller error or completely negating the individual error.

However from two evaluations, the clocking error and the cross-over error can be separated into their contributing elements. To accomplish this, a 180 degree negating methodology is employed as now described. Referring again to FIG. 3, when table 25 is situated at a known angular rotation, displacement readings are taken at first and second probe strikes and are stored as X1 and X2, respectively, during a first drop D1.

Figure 6:
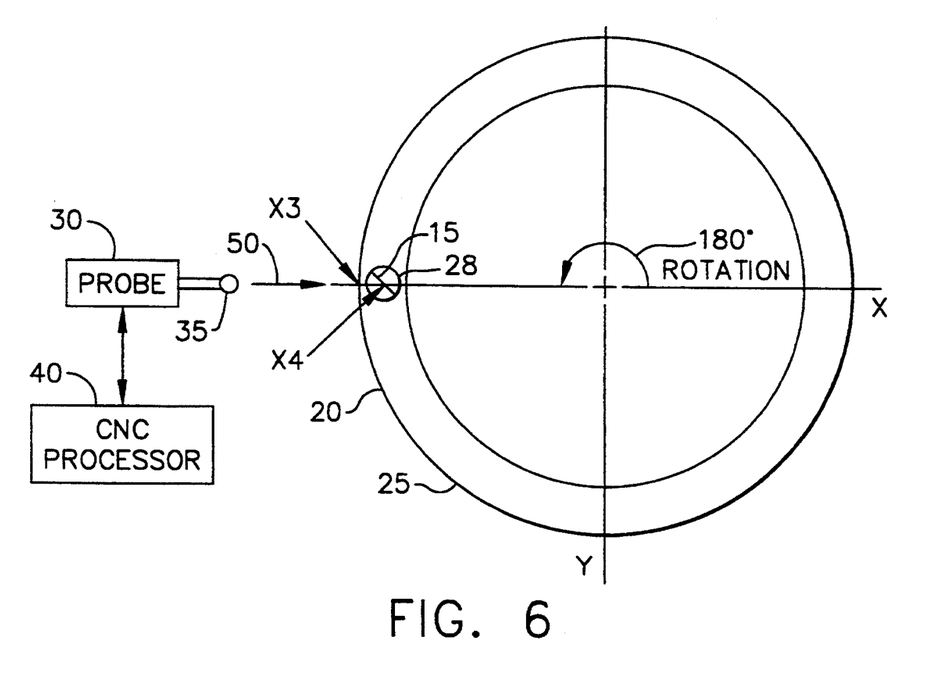
FIG. 6 is a top view of a radial inclined surface datuming device which depicts 180 degrees of rotation of the work piece.

The machine's table 25 is then rotated 180 degrees, and a second drop is established as seen in FIG. 6. The non-sensitive surface 20 is probed and stored as X3 and the sensitive inclined surface 15 is probed and stored as X4. The second drop D2 is calculated by subtracting X3 from X4, yielding |X4−X3|=D2.

The two drops D1 and D2 are now combined and compared to the previously established correct target drop (TD) to establish both the clocking error and cross over error. The clocking error, (C.E.), is the ASIN of the previously established correct target drop (TD) subtracted from the mean error condition divided by the radial distance (RD) of the center of the inclined surface probed position. Expressed in equation form, C.E.=ASIN(((D1−D2)/2)−TP)/RD. The probe's cross-over-error (C.O.E.), is the average spread of the two drops. Expressed in equation form, C.O.E.=(D1−D2)/2.

Figures 7, 8, 9A:
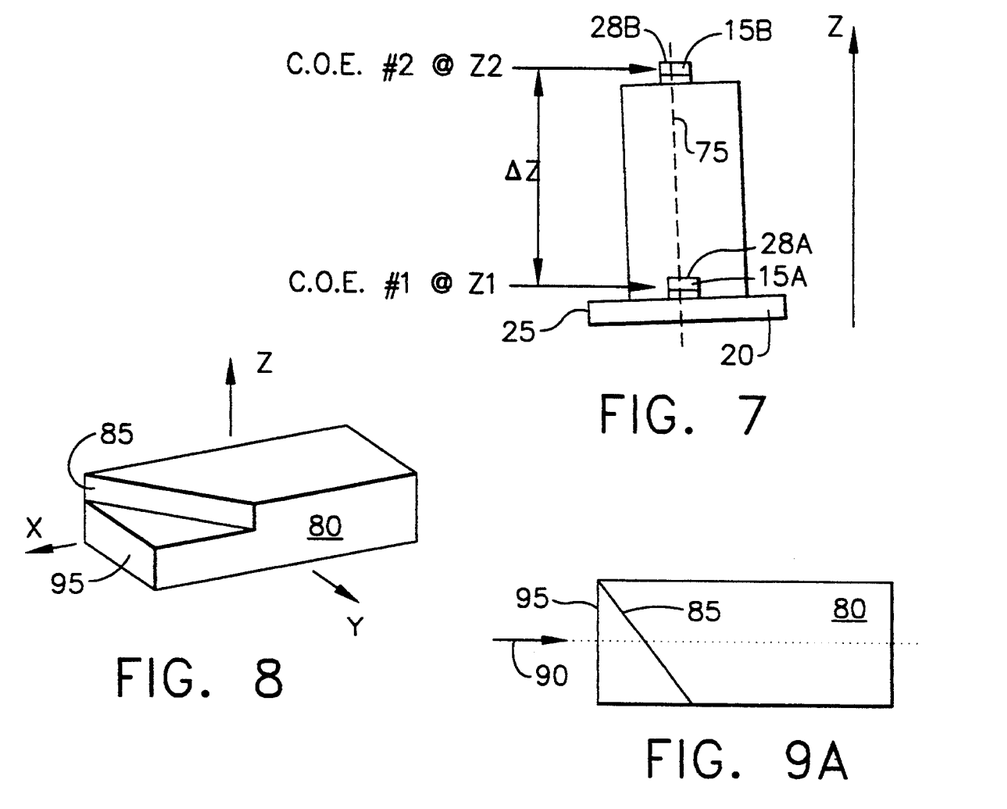
FIG. 7 illustrates cross-over error at two different Z axis positions using two inclined surface datuming devices.
FIG. 8 is a perspective view of a cross direction inclined surface datuming device.
FIG. 9A is a top view of the cross direction surface datuming device of FIG. 8.

It is now assumed that member 25 is provided with two inclined axial surfaces 15A and 15B situated at different locations on the Z axis as indicated in FIG. 7. That is, two datuming pins 28A and 28B are situated at different locations with respect to the Z axis such that their respective inclined surfaces 15A and 15B are located at different locations with respect to the Z axis. With two inclined surfaces 15 at different "Z" positions, the difference in apparent cross-over is used to establish the machine's spindle point in the "Y" direction. FIG. 7 shows a cross-over error at Z1 as C.O.E. #1 at Z1, and another cross-over error at Z2 as C.O.E. #2.

In one embodiment for example, the first inclined surface for C.O.E. #1 could be on the machines pallet receiver, pallet top, or lower on the fixture, and the inclined surface for C.O.E. #2 at the top of the fixture. The center line of rotation is depicted in FIG. 7 as center line 75.

The sequence of operation for the machine's spindle point is now described. The cross-over error is established at the Z1 position and the Z2 position in the same method as described above, namely, C.O.E. #1=(D1−D2)/2. and C.O.E. #2=(D3−D4)/2. The distance between the two evaluations (ΔZ), is established by subtracting Z1 from Z2, namely, ΔZ=(Z2−

Z1). The change in the two C.O.E.'s. (ΔC.O.E.) is C.O.E. #1 subtracted from C.O.E. #2. Also, ΔC.O.E.=C.O.E. #2 −C.O.E. #1.

The machine's "C" axis Spindle Point in the "Y" direction ("C" SP y) taper per foot (T/Ft.), is the change in C.O.E. divided by the distance between the two observations times 12; "C" SP y=12(ΔC.O.E./ΔZ) T/Ft. and is calculated by CNC processor 40, not shown in FIG. 7.

The apparatus and methodology of the present invention can also be used to rapidly check changes in the probe's relative cross direction displacement, i.e. a direction perpendicular to the probe's line of travel. In that case, a datuming member 80 having a sensitive surface 85 as seen in perspective in FIG. 8, can be used in place of pin 28 employed earlier. Member 80 exhibits the geometry of a cross direction surface cube as depicted in FIG. 8 in which the inclined sensitive surface face 85 is sensitive to changes in cross direction, namely the Y direction which is perpendicular to the probe's line of travel. Member 80 may thus be referred to as a cross-direction A0 surface device.

Figure 9B:
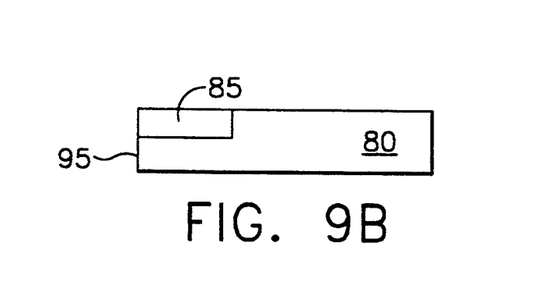
FIG. 9B is a side view of the cross direction surface datuming device of FIG. 8.

FIGS. 9A and 9B show a top view and a side view, respectively, of member 80. The probing direction is indicated generally in FIG. 9A by arrow 90. In this embodiment, the non-sensitive surface, namely cross direction surface 95, is straight. This is for linear displacement evaluations for items such as 1) when a probe's stylus or tip becomes lose; 2) probe's cross over control, and 3) tool block registration evaluations of a series of machines. The straight plane geometry of non-sensitive surface 95 which is used for measuring linear displacements of FIG. 8 is in contrast to the curved nature of non-sensitive surface 20 of FIG. 1 which is used for measuring angular displacements.

The inclined surface cube 80 can be positioned in the cross direction to indicate a specific drop. The cube's inclined surface or sensitive surface 85 is then set to the machine's center line of rotation and can be used for both absolute as well as relative evaluations. Thus, it can then be employed as a rapid transfer device to evaluate the probes "Y" direction (C.O.E.) as well as relative changes that can occur if the stylus of the probe becomes loose. It can also be used to evaluate different probe's "Y" direction displacement, as they are introduced to the machine.

More specifically, after the cross direction surface cube 80 has been set to the specific intended drop, the cube 80 is then positioned to the machine's center line of rotation. The probe's drop value is then tracked from the cube by CNC processor 40 to establish relative shifts such as seen when a probe's stylus becomes lose, as well as its absolute position for maximum allowable cross over-error to contain chord measurements or to establish chord error offsets to account for chord errors.

Figure 10:
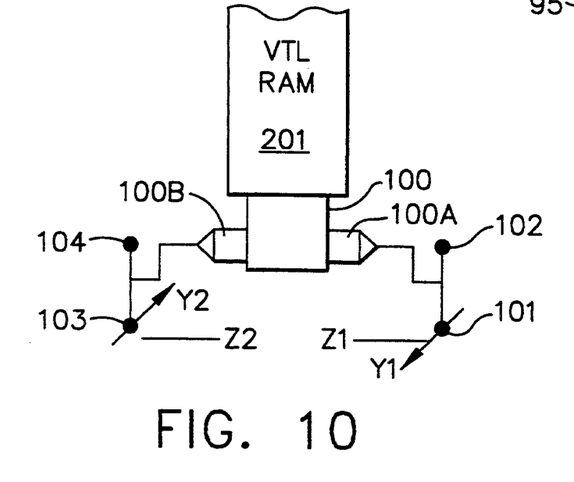
FIG. 10 is a representation of a probe block with two horizontal probes and a first ram machine.

In taking a given probe across multiple machines and depending on probe stylus configuration, the relative changes to the inclined surface cross direction cube 80 enables the machine's tool block registration system to be evaluated as seen in FIG. 10. In the configuration of FIG. 10, a probe block 100 is depicted with two horizontal probes 100A and 100B, each having a dog-leg type, two ball probe stylus with styli balls 101, 102, 103 and 104. Probe 100A includes balls 101 and 102. Probe 100B includes balls 103 and 104.

The sequence of operation for tool block registration evaluation is now described using the above configuration. Styli balls 101 and 103 are probed in the Z direction to the top of the cross direction surface cube 80 to establish their Z1 and Z2 position as seen on VTL ram machine 201. The same balls are then checked into a non-sensitive surfaces 95 and sensitive surfaces 85 (on a second machine). It is assumed that two cubes 80 are present on the structure to be evaluated such that two sensitive inclined surfaces 85 and two non-sensitive surfaces 95 are provided. The respective drops D1 and D2 are then determined as previously described and the respective cross-over errors are determined.

In other words, ball 101 and ball 103 are evaluated to the top of inclined surface cube 80 for their Z position trip positions, Z1 and Z2 and their drop conditions for their Y direction conditions, Y1 and Y2 is indicated in FIG. 10.

Figure 11:
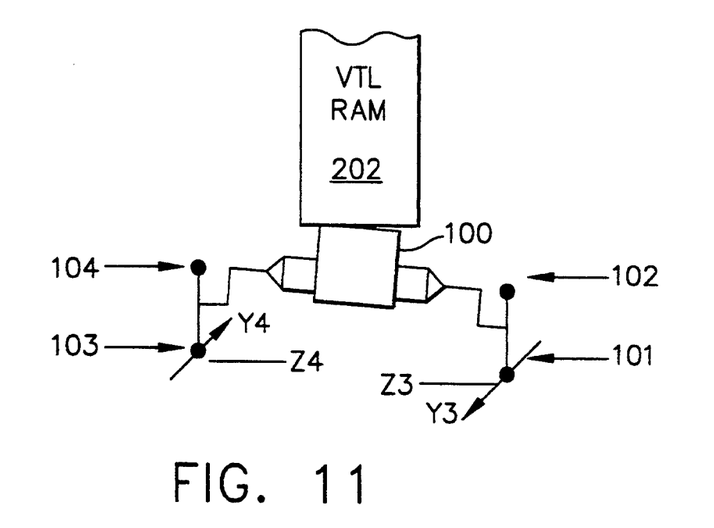
FIG. 11 is a representation of the probe block of FIG. 10 after removal to a second ram machine.

The same probe block 100 is then moved to succeeding ram machines such as 202, etc. as seen in FIG. 11 and is evaluated for the ball's Z and Y directions. As the same block's registration system is employed, the resulting shifts indicate the machine's or ram's relative registration alignments. More specifically, shifts in the two balls (Ball #101 and ball #103) ZΔ indicates the ram's registration inclination in the X direction. This is calculated by the 12 (Z2−Z1) / X axis ball Δ and results in the Taper/Ft.

The Shift in the two balls Y directions indicates the ram's tool block relative clocking condition. This is calculated in the same manner as the X direction inclination except the Y D1 and Y D2 values replace the Z1 and Z2 values and the result is the ram's relative clocking error. The average Y shift is a composite error of the rams translation and Y direction. To separate these quantities, probes exhibiting different Z direction tool lengths would need to be employed.

While embodiments of the invention have been discussed where the datuming device is situated on a member which is moving with respect to the displacement probe, it will be appreciated that by locating the datuming device at a fixed location, motion of the displacement probe itself may also be detected and measured. For example, although not specifically shown in FIGS. 10 and 11, an embodiment is contemplated wherein the inclined surface datuming device is situated at a fixed location below and in contact with the probe balls of FIGS. 10 and 11. In this manner, any undesired motion of the probe can be detected with respect to the fixed location of the datuming device using essentially the same techniques as already described.

Figure 12:
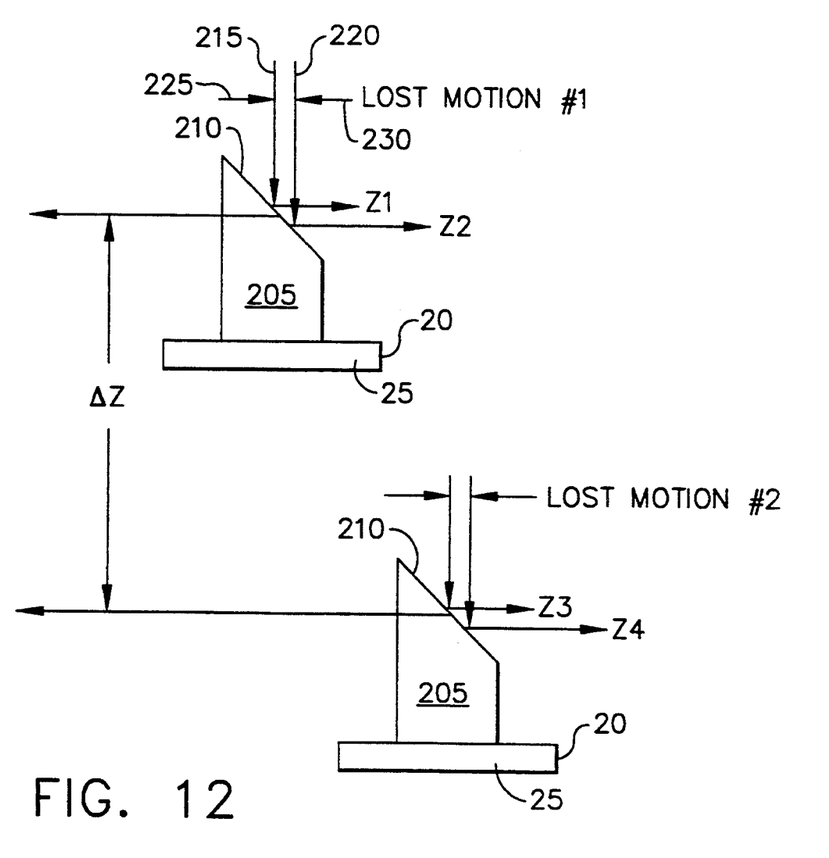
FIG. 12 is a representation of an inclined surface datuming device configured to enable lost motion evaluations.

Lost motion evaluations can also be accomplished through the use of an inclined surface and cross direction probing in accordance with the present invention as seen in FIG. 12. FIG. 12 shows a member 205 with an inclined sensitive surface 210 situated on reference member 25 having a non-sensitive surface 20. The sequence of operations for lost motion evaluations is now described. The inclined sensitive surface 210 is positioned with its face at 45 degrees with respect to the probing direction indicated by arrows 215 and 220. It is noted, however, that the probing direction is not the axis being evaluated for the observed lost motion.

The probe is then driven to a specific position in line with the inclined surface with the direction of approach indicated by arrow 225. The inclined surface is then probed in the cross or probing direction. In the example of FIG. 12, the probe contact position is recorded as Z1.

The probe is then moved beyond the original specific position by several inches and is then reversed to approach the original position from the opposite direction indicated by arrow 230. After the probe contact position is reached, the cross probing cycle is completed and Z2 is captured and stored. Since the sensitive surface 210 is inclined at 45 degrees, the difference between the two Z positions (Z1 and Z2) equals the observed lost motion at this Z position, namely lost motion #1 in FIG. 12. It is noted that the observed lost motion is a composite of both linear and angular lost motion (skew).

To separate these two quantities of linear and angular lost motion, two evaluations are required at different Z positions such as indicated in FIG. 12 for lost motion #1 and lost motion #2. The change in lost motion times 12 divided by the difference in Z positions results in the angular lost motion, T/Ft. In other words, the change in lost motion divided by the change in the Z position ($\Delta Z$) is the ASIN of the rotary lost motion element.

Figures 13, 14:
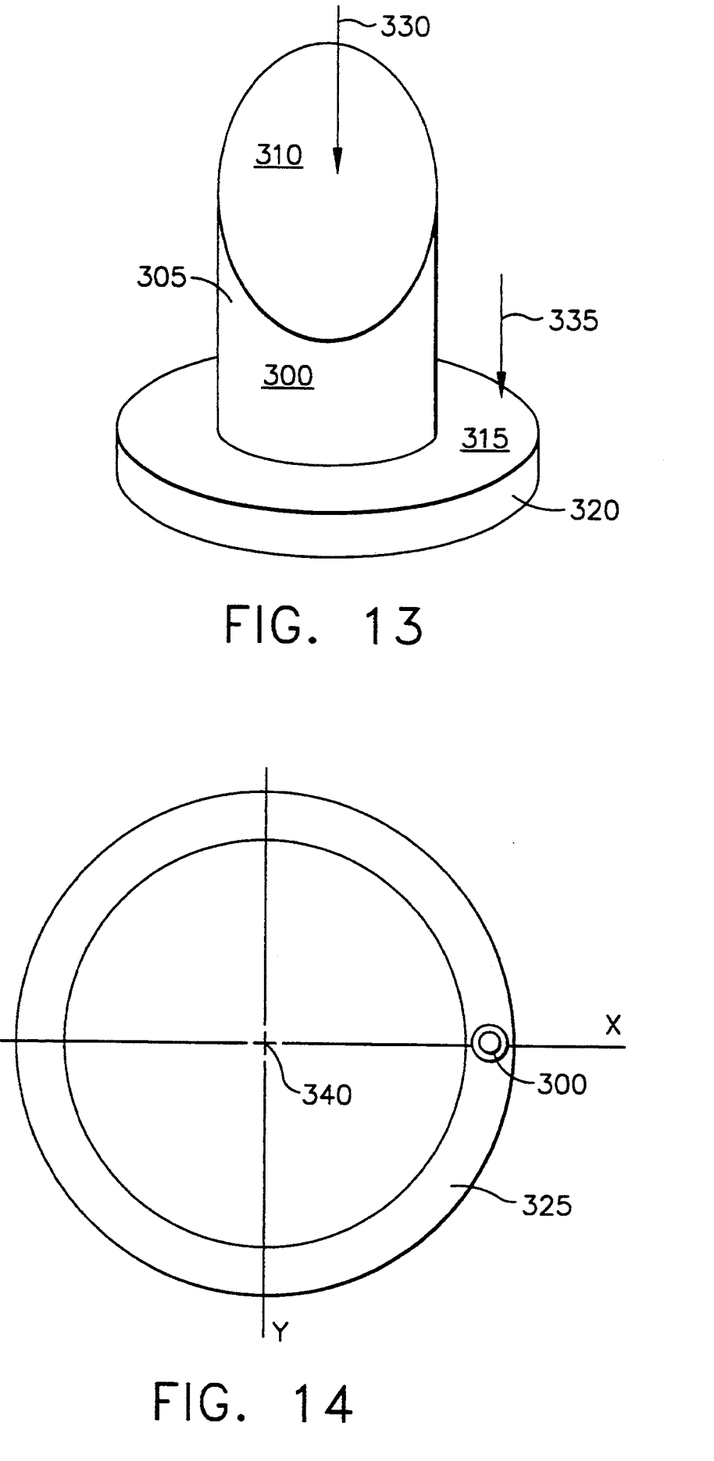
FIG. 13 is a perspective view of an axial direction inclined surface datuming device.
FIG. 14 is a top view of the axial direction inclined surface datuming device of FIG. 13 shown mounted on a work piece, fixture or palette.

The apparatus and methodology of the present invention can also be used to rapidly check changes in relative axial direction displacement to determine displacements not parallel with the probe's direction of travel. More particularly, axial direction surface devices can be employed similarly to the radial direction inclined surface device 28 of FIG. 1 and the cross direction inclined surface device 80 of FIG. 8 discussed earlier. However, with such axial direction surface devices, the probing direction is now in an axial direction as indicated in FIG. 13 which shows an axial direction surface device 300.

Axial direction surface device 300 includes a substantially cylindroidal pin 305 having an inclined sensitive surface 310. Device 300 also includes a non-sensitive surface 315 at its base 320. In actual practice, one or more axial direction surface devices 300 are situated on a table, work piece or fixture 325 as seen in FIG. 14. Displacement measurements are taking by probing sensitive surface 310 and non-sensitive surface 315 in a manner analogous to that discussed earlier. However, with axial direction device 300, the probing direction of the sensitive surface 310 is along the vertical axis of device 300 as indicated by arrow 330 in FIG. 13. The probing direction of non-sensitive surface 315 is also parallel with the vertical axis as indicated by arrow 335. In FIG. 14, the vertical axis may be thought of as coming out of the paper at center point 340. The drop is established between sensitive surface 310 and non-sensitive surface 315 as discussed earlier. In this manner, displacements not parallel with the probe's direction of travel may be observed as work piece or fixture 325 moves from position to position.

While the above description sets forth a datuming apparatus, it is clear that there is also disclosed a method of measuring displacement on a machine tool having a movable member which is probed by a displacement probe. The method includes the steps of providing the member with a datuming device including a non-sensitive surface and a sensitive surface. The method also includes the step of probing the non-sensitive surface and the sensitive surface to measure the drop therebetween when the member is in a first position. The method further includes the step of moving the member to a second position. The method still further includes the step of probing the non-sensitive surface and the sensitive surface to measure the drop therebetween when the member is in the second position.

The foregoing has described a datuming device for measuring displacements not parallel with a probes line of travel. The datuming device permits automation of displacement evaluations which were previously skill dependent and time consuming, and which therefore were only performed when significant concerns or problems existed. A significant advantage of the inclined surfaces probe datuming devices and the above described methodologies is that they now enable these evaluations to be performed automatically under NC type control. Moreover, with the present invention, these evaluations are now performed in a fraction of the previous time, with increased precision, and without being skill dependent or requiring special gauges or test equipment. These evaluations are not just for maintenance restoration, but also enable continuous monitoring to restrict machining, to establish improved machining offsets to achieve increased accuracy in the work piece, and to confirm the machines condition before and after offsets. Such advantages are becoming more important as the machining process is further automated and as the cost, deliverability, and quality of the work piece become contingent on the quality and dependability of the machine tools.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. A datuming device which is capable of being probed by a displacement probe when used with a machine tool having a movable member, said datuming device comprising:
    a body situated on said movable member;
    a non-sensitive surface which acts as a reference for said probe, said non-sensitive surface being situated on one of said body, a fixture of the machine tool and said movable member, and which when probed by said probe exhibits a constant displacement when said movable member is moved from a first position to a second position, and
    a sensitive surface, situated on said body, which when probed by said probe exhibits a changing displacement when said movable member is moved from said first position to said second position.

2. A datuming system for use with a machine tool having a movable member comprising;
    a datuming device situated on said movable member;
    a displacement probe for probing said datuming device to measure displacement;
    a non-sensitive surface, said non-sensitive surface acting as a reference for said probe, and
    a sensitive surface, situated on said datuming device, which when probed by said probe exhibits a changing displacement when said movable member is moved from a first position to a second position.

3. The datuming system of claim 2, further comprising:
    rotating means, coupled to said movable member, for rotating said movable member from said first position to said second position.

4. A datuming system, comprising:
    a datuming device situated at a fixed location;
    a displacement probe for probing said datuming device to measure displacement with respect to said datuming device;

a non-sensitive surface, said non-sensitive surface acting as a reference for said probe, and a sensitive surface, situated on said datuming device, which when probed by said probe exhibits a changing displacement when said probe is moved from a first position to a second position.

5. In a machine tool having a movable member which is probed by a displacement probe, a method of measuring displacement comprising the steps of:

providing said member with a datuming device including a non-sensitive surface and a sensitive surface;

probing said non-sensitive surface and said sensitive surface to measure the drop therebetween when said member is in a first position;

moving said member to a second position, and probing said non-sensitive surface and said sensitive surface to measure the drop therebetween when said member is in said second position.

6. The method of claim 5 wherein said datuming device employed in said providing step is a radial direction inclined surface device.

7. The method of claim 5 wherein said datuming device employed in said providing step is a cross direction inclined surface device.

8. The method of claim 5 wherein said datuming device employed in said providing step is an axial direction inclined surface device.

9. The method of claim 5 wherein said moving step further comprises rotating said member from said first position to said second position.

* * * * *